United States Patent [19]

Koch

[11] Patent Number: 5,187,646
[45] Date of Patent: Feb. 16, 1993

[54] DATA STORAGE DEVICE WITH AN ARRANGEMENT FOR RECEIVING A TRANSPORTABLE, CARD-SHAPED OR DISK-SHAPED DATA STORAGE UNIT SO THAT THE DATA STORAGE UNIT IS INACCESSIBLE IN AN OPERATING POSITION

[75] Inventor: Siegfried Koch, Villingen-Schwenningen, Fed. Rep. of Germany

[73] Assignee: Mannesmann Kienzle GmbH, Villingen, Fed. Rep. of Germany

[21] Appl. No.: 827,474

[22] Filed: Jan. 28, 1992

Related U.S. Application Data

[63] Continuation of Ser. No. 582,437, Sep. 13, 1990, abandoned.

[30] Foreign Application Priority Data

Sep. 13, 1989 [DE] Fed. Rep. of Germany ....... 3930545

[51] Int. Cl.⁵ .......................... H05K 7/16; H05K 1/18; H01R 9/09
[52] U.S. Cl. ...................... 361/395; 439/77; 361/398
[58] Field of Search .............. 361/340, 344, 380, 391, 361/393, 394, 395, 399, 412, 413, 428, 398, 408; 200/50 A; 235/441, 486; 439/67, 77, 131; 312/12; 174/254

[56] References Cited

U.S. PATENT DOCUMENTS 4,087,146  5/1978  Hudson, Jr. ................ 439/67
4,214,172  7/1980  See ............................. 361/380 X
4,611,864  9/1986  Yokota ......................... 312/12
4,625,259  11/1986 Krechmer et al. ............ 361/340
4,652,976  3/1987  Fushimoto ................... 361/413
4,689,721  8/1987  Damerow et al. ............ 439/67 X
4,763,300  8/1988  Yukawa ....................... 361/399 X
4,858,070  8/1989  Baron et al. ................. 361/395 X
4,872,139  10/1989 Okamoto et al. ............. 361/344 X
4,885,436  12/1989 Pham et al. .................. 200/50 A
4,954,928  9/1990  Jullien ......................... 361/391
4,982,063  1/1991  Tsunekawa et al. .......... 200/50 A X

FOREIGN PATENT DOCUMENTS 60-173790  9/1985  Japan ........................... 361/380

Primary Examiner—Leo P. Picard
Assistant Examiner—Michael W. Phillips
Attorney, Agent, or Firm—Anderson Kill Olick & Oshinsky

[57] ABSTRACT

An apparatus for receiving a transportable card-shaped or disk-shaped data storage, which apparatus is arranged at the front wall of a device and the data storage can be brought into an operating position by it, the data storage being in the operating position in a parallel position relative to the front face of the respective device and is sunk in the front wall so as to be inaccessible. In particular, the apparatus includes a cover, which is supported at the front wall of the device so as to act like a rocker, a holding and contacting arrangement for a data storage being constructed at the inside of the device, as well as a printed circuit board which is fastened in the device so as to be stationary and is connected with the cover via a flexible conduction band exercising a springing effect.

7 Claims, 4 Drawing Sheets

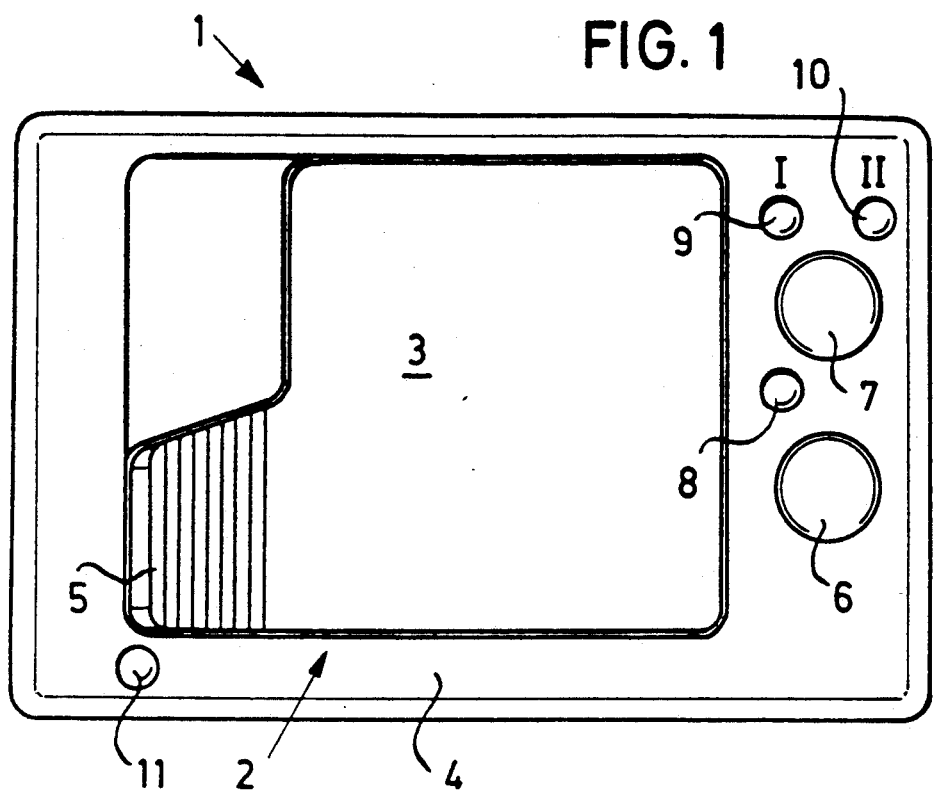
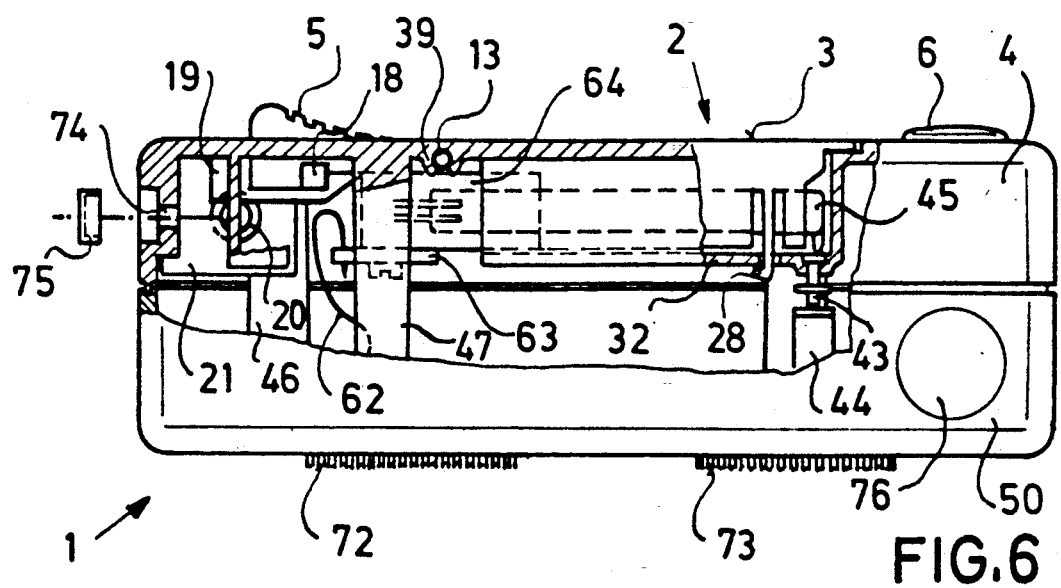

DATA STORAGE DEVICE WITH AN ARRANGEMENT FOR RECEIVING A TRANSPORTABLE, CARD-SHAPED OR DISK-SHAPED DATA STORAGE UNIT SO THAT THE DATA STORAGE UNIT IS INACCESSIBLE IN AN OPERATING POSITION

This is a continuation application of Ser. No. 07/582,437, filed Sep. 13, 1990, now abandoned.

BACKGROUND OF THE INVENTION

The invention is directed to an apparatus for receiving a transportable, card-shaped or disk-shaped data storage at the front wall of a device, by means of which the data storage can be brought into an operating position in which it is inaccessible.

Due to high storage capacity and satisfactory data security, transportable data storages, e.g. in the form of chip data cards or similarly easily manageable disk-shaped data storages with EEPROMs or buffered RAMs, are gaining increasing importance, specifically for a multitude of applications.

However, with the increasing importance of the transportable data storages and the increase in functions and valuable contents of these data carriers, the demands placed on the means serving as the receptacle for these data storages in their write and read positions within a device are also increasing. For example, when inserting such a data storage a plurality of closely adjacent contacts must be contacted without causing damage or bridging on the one hand, which requires an exact guidance and fixing of the position of the data storage, and, on the other hand, locking and tamper-proofing means are required.

For this reason, special transport carriages for inputting and releasing card-shaped or disk-shaped data storages and widely varying locking and covering means have already been suggested for protecting against unauthorized or inadmissable removal, e.g. within a determined period of time, or simply against an unintentional change in position caused by striking against a card-shaped data storage projecting out of a slot. Accordingly, known apparatuses for receiving card-shaped or disk-shaped data storages are relatively costly receptacle units which are neither universally usable nor producible in large series because of their structural design.

Such apparatuses for receiving, preferably, data cards originate from credit card operations with bank tellers, and pay telephones, as well as in automatic parking or refueling machines. They are generally constructed and assigned to the respective device in such a way that the input of a data card through a slot is effected substantially vertically relative to the front wall of the device, which decisively limits application, and a relatively large construction depth of the receptacle apparatus is accordingly required.

The collection and transfer of data in motor vehicles is an important area of use in which, in contrast to the preceding, the data storage is generally in use over a longer period of time as a data collector and/or issuer of commands and in which the construction depth for the apparatus for receiving transportable data storages is to be kept as small as possible. As an additional complication in this area of use, protective devices against manipulation and soiling are indispensable in view of the documentary value of the records in the data storages, and the space requirement is accordingly considerable.

Further problems consist in that a data storage receptacle should preferably be assigned to the respective devices for determining driving data and work time or fare, that is, should be located in the visual field of the driver, where there is a considerable shortage of space anyway due to the multitude of instruments and actuating devices. A data storage receptacle for use in the vehicle must accordingly be particularly compact and suited to the demands of large-series manufacturing applicable to the area of the vehicle devices. But this also applies to other uses, e.g. when such data storages are used in a general way for determining work time, in which case the construction depth for a suitable "attendance sheet" should be small for aesthetic reasons, or in connection with display panels, e.g. in decentralized production data collection, where such a data storage can be used either for collecting machine data or as a data carrier accompanying products.

SUMMARY OF THE INVENTION

Accordingly, it is an object of the present invention to provide an apparatus for receiving a card-shaped or disk-shaped data storage which is distinguished by small construction depth and multiple uses, in which the data storage is inaccessible in the operating position and which has good capability for series production.

Pursuant to this object, and others which will become apparent hereafter, one aspect of the present invention resides in a cover assigned to an opening provided in the front wall of the device, and supported at the front wall so as to be rotatable. Holding means for the data storage are constructed at the device side of the cover in such a way that the data storage is substantially in a parallel position relative to the front surface of the device when the cover is in the closed position. Additionally, gripping means, for handling the cover when opening and closing, are arranged at the front side of the cover.

In a different embodiment, the cover is constructed as a rocker member and the holding means for the data storage are formed on at one side of the rocker member with reference to the bearing axis of the rocker member, whereas the other side of the rocker member is constructed at least partially as a grip element.

A preferred embodiment of the invention is a data storage device which is distinguished in that a two-part housing comprising an upper part and a lower part is provided. A structural component group is formed by the cover and a printed circuit board. The cover is joined with the upper part after assembly of the data storage device via bearing elements which can be connected with one another so as to lock, and the printed circuit board is fastened indirectly by connecting the two housing parts.

The decisive advantage offered by the apparatus, according to the invention, consists in that it enables an arrangement of a card-shaped or disk-shaped data storage parallel to the front wall of a device so that the overall height required for attaching such a data storage receptacle unit can be considerably reduced. The apparatus, according to the invention, further enables a tamper-proof and soil-resistant arrangement of such data storages, as well as handling which is particularly advantageous with respect to ergonomics. The new apparatus is suitable for assignment to the front wall of an installed device, e.g. a tachograph or fare calculator, or for integration in a device which can be installed or attached optionally, e.g. in a relatively flat display device, wherein the respective printed circuit boards which are required for the device functions and are generally arranged so as to be parallel to the front wall can preferably be expanded for receiving the write-read electronics of the utilized transportable data storage.

On the other hand, the inventive apparatus is also suitable for providing an autonomous data storage device for a transportable data storage which is distinguished by a flat constructional shape whose surface area is substantially determined by the largest surface area of the data storage and which can be fastened e.g. simply by adhesion, and can accordingly be expected to gain wide acceptance, since it can be used either as an independent device or as an added device to already existing devices, as required.

It is further advantageous that the manufacturing and assembly cost is reduced to a minimum as a result of the small number of structural component parts, which can be assembled in a simple manner, and as a result of providing the structural component group comprising cover and printed circuit board, which permits operation testing already in the preassembly stage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 shows a front view of an autonomous data storage device which is equipped with the apparatus according to the invention;

FIG. 6 shows a side view of the data storage device according to FIG. 1, partly in section.

DETAILED DESCRIPTION OF THE PREFERRED EMBODIMENTS

Figure 4:
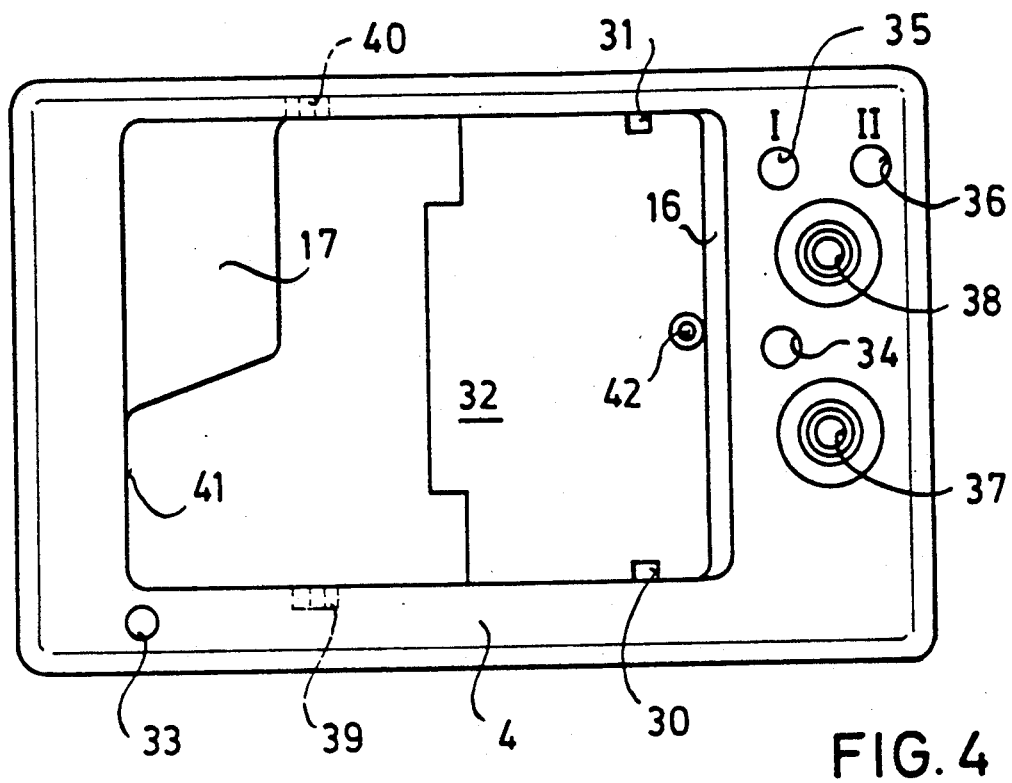
FIG. 4 shows a front view of the upper part of the housing of the data storage device.

The data storage device, shown from the front in FIG. 1, comprises a square, relatively flat housing 1, and a cover 2 which can be swiveled up arranged at the front side of the housing 1. The cover 2 is preferably constructed and supported as a rocker member, wherein the front surface of one side 3 of the rocker member serves to receive the utilized data storage, and closes so as to be substantially flush with the front surface of an upper part 4 of the housing 1. In this way the data storage is arranged vertically in the housing 1 so as to be absolutely inaccessible in the operating position.

The other side of the rocker member is formed as a grip element 5 which projects out at the front surface of the housing 1 in the closed state of the cover 2. Furthermore, two keys 6 and 7 are shown in FIG. 1, one of which—6—serves to inform the device that the data storage is to be removed. A light emitting diode 8 assigned to the key 6 indicates the release of the cover 2, which is suitably locked, when a software-controlled data communications termination and appropriate acknowledgements of the removal of the data storage are effected after actuating the key 6. A switching relating to a specific application, e.g. between on-duty and off-duty in taxi operation or between standby time and pause in utility vehicle operation, can be effected with the key 7. The driving times of the respective driver are recorded automatically in a manner similar to tachographs. An additional light emitting diode serving to indicate operation is designated by 11.

Depending on the application, it is conceivable to provide a plurality of keys, e.g. when the data storage device is to be used for operation data collection or production data collection, or additional keys can be omitted, excluding the release key 6 for releasing the data storage. It is also conceivable that the function of the key 6 can be placed directly in the cover 2, i.e. that a switching function be assigned to the cover 2, which can be triggered by means of pressing on one side 3 of the cover 2 and e.g. can be implemented by means of a foil switch assigned to the cover 2 or by means of a touch-sensitive switch together with suitable indicating symbols. The surface area requirement for the actual apparatus for receiving the data storage is accordingly reduced and favorable preconditions for the arrangement of a plurality of such apparatuses adjacent to one another or one above the other are accordingly provided.

Figure 2:
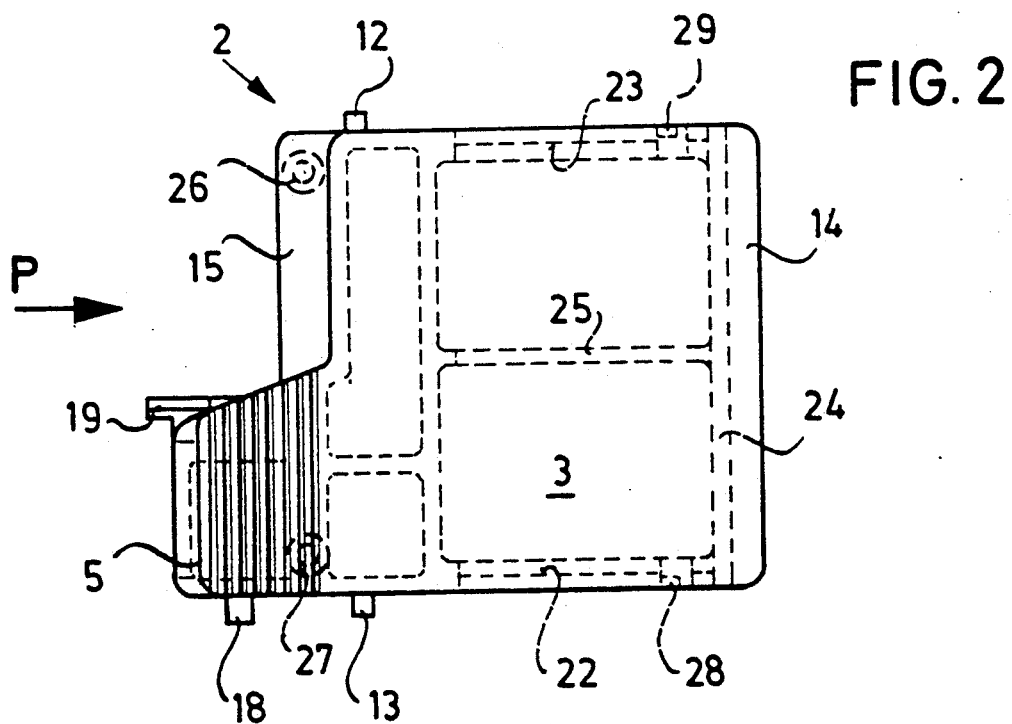
FIG. 2 shows a front view of the cover of the data storage device according to FIG. 1.

FIG. 2 shows a front view of the cover 2. Bearing journals 12 and 13 are formed on the cover 2 at opposite sides, so that the cover 2 is a rocker member with reference to the bearing axis. In addition, FIG. 2 shows that strips 14 and 15 are constructed at the cover 2, which strips 14 and 15, together with corresponding wall parts 16 and 17 which are constructed at the upper part 4 of the housing 1, form a seam connection which acts as a stop when closing the cover 2. A stop which is effective when swiveling the cover 2 into the opened position is designated by 18. A locking bar 19 forms a locking mechanism with a spring-mounted armature 20 of an electromagnet 21, as can be seen in FIG. 6, which locking mechanism effects a locking of the cover 2 in the currentless state of the electromagnet 21.

Figure 3:
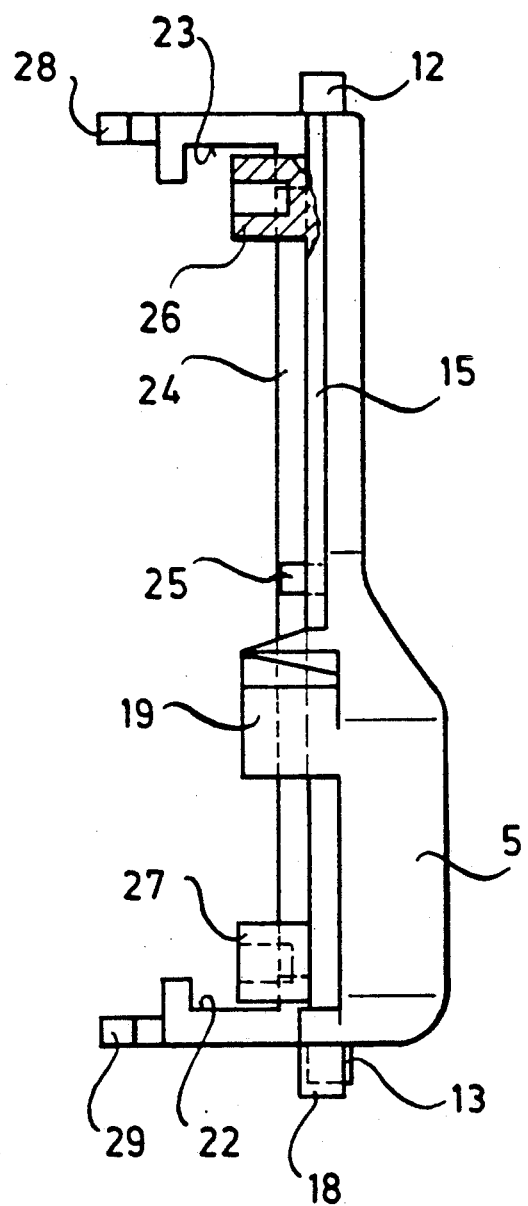
FIG. 3 shows a side view of the cover corresponding to arrow direction P in FIG. 2.

Furthermore, as can be better seen from the side view of FIG. 3, U-shaped guide sections 22 and 23, which are assigned to the data storage, and support ribs 24 and 25, are constructed at the cover 2. Moreover, FIG. 3 shows threaded shoulders 26 and 27 as well as locking bars 28 and 29 which, as can be seen from FIG. 4, engage through openings 30 and 31 in an intermediate base 32 formed on at the upper part 4 when closing the cover 2, and hold the cover in the closed position. In addition, openings 33, 34, 35 and 36 as well as receptacle tubes for holding the light emitting diodes 8, 9, 10 and 11, which receptacle tubes are assigned to the openings 33, 34, 35 and 36 and face inward, as well as bearings 37 and 38 for the guidance of the keys 6 and 7 are formed in the upper part 4 of the housing 1. Bearings, which are assigned to the bearing journals 12 and 13 and are constructed at the inside of the front wall of the upper part 4, are designated by 39 and 40. The bearing journals 12 and 13 of the cover 2 are connectable with the bearings 39 and 40 so as to lock when the cover 2 is mounted at the front wall, i.e. inserted into the opening 41 in the front wall proceeding from the inside of the upper part 4.

A bore hole 42, which is located in the intermediate base 32 and provided with a countersink, serves for the support of a key pin 43 (FIG. 6) which actuates a microswitch 44 which switches the write-read power supply for the data movement when the cover 2 is closed and the data storage 45 is inserted.

Figure 5:
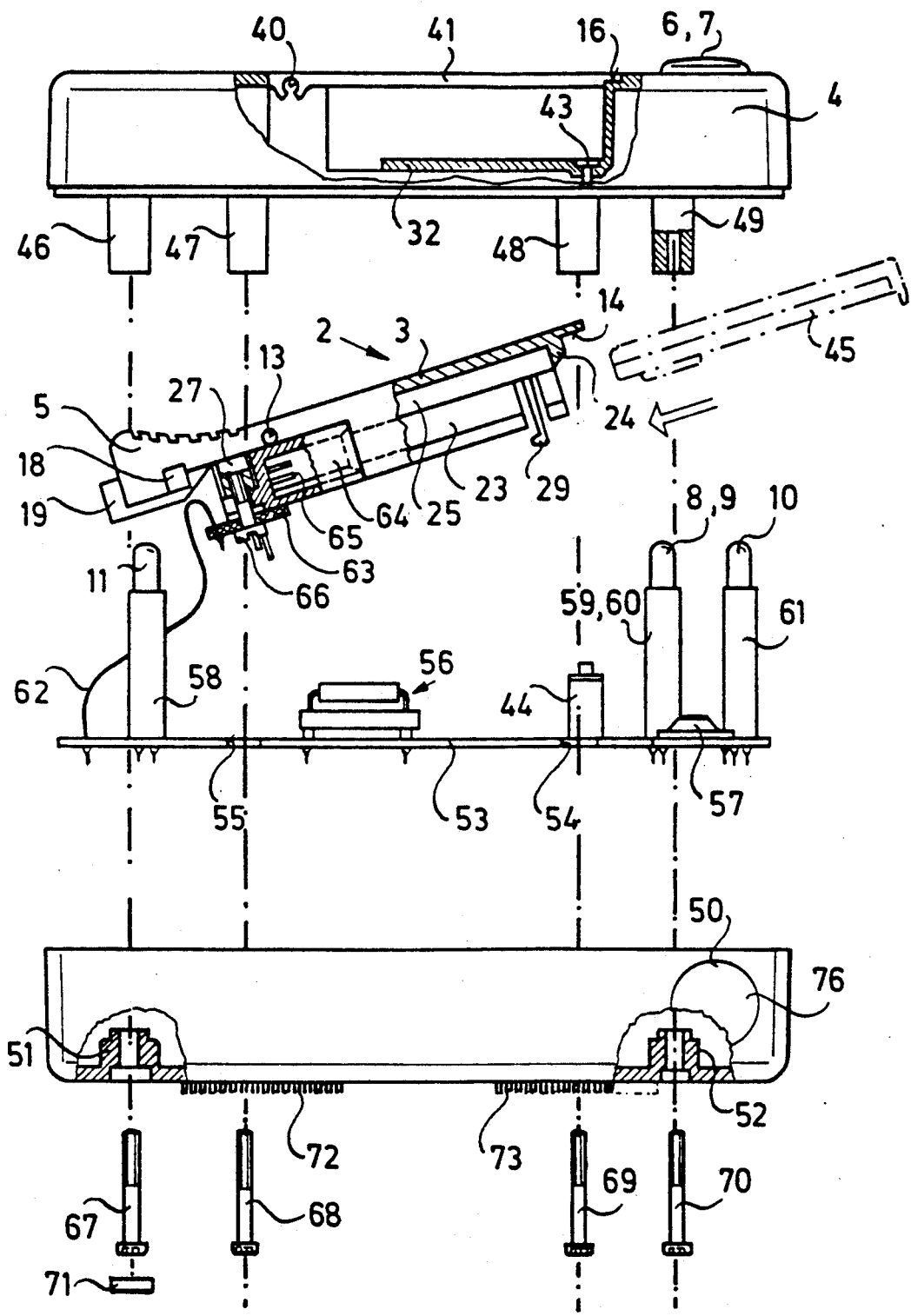
FIG. 5 shows an exploded view of the data storage device.

The exploded view of FIG. 5 shows that spacer pins 46, 47, 48 and 49 are formed on at the upper part 4 of the housing 1. A lower part 50 of the housing 1 carries shoulder posts assigned to the spacer pins 46, 47, 48 and 49, two of which shoulder posts 51, 52 are visible in FIG. 5. The shoulder posts serve as support for a printed circuit board 53 which carries circular cut out portions which correspond to the shoulder posts, two of which cut out portions 54, 55 are shown in FIG. 5. The printed circuit board 53 carries the electronic components for the data transfer between the data storage 45 and transmitters located outside the data storage device and/or a computer. It carries electrical components for the power supply, at least one adaptor interface and a program storage 56 which is drawn in FIG. 5 as representative of the multitude of electronic components. One of two switches assigned to the keys 6 and 7 is designated by 57. The insulating sleeves assigned to the light emitting diode lines are designated by 58, 59, 60 and 61.

As follows from FIG. 5, the printed circuit board 53 is electrically connected, via a flexible conduction band or ribbon conductor 62, with an additional printed circuit board 63 which is assigned to a connector base 64 and is mechanically and electrically connected with the latter via connector pins 65. The component group is fastened at the cover 2 by means of screws, one of which—66—is shown, via the threaded shoulders 26 and 27, specifically in such a way that the connector base 64 is arranged so as to be aligned with the guide sections 22 and 23. The printed circuit board 53 and the cover 2 accordingly constitute a component group which is capable of being tested prior to assembly of the data storage device.

The printer circuit board 53 is inserted into the lower part 50 of the device 1 during the assembly of the data storage device. The cover 2 is inserted through the opening 41 in the upper part 4 in the next assembly step and locks into the supports 39 and 40. The lower part 50 and upper part 4 of the housing 1 are then joined and screwed together by means of through-screws 67, 68, 69 and 70 engaging into the spacer pins 46, 47, 48 and 49, wherein the printed circuit board 53 is held between the two housing parts 4 and 50. A seal which is assigned to the screw 67 is designated by 71, and hooked bands which enable a fastening of the data storage device by means of a loop and hook connection such as Velcro ® are designated by 72 and 73.

It can be seen from FIG. 6, which shows the finished data storage device with inserted data storage 45, that the spring-mounted armature 20 is accessible through an opening 74 in the upper part 4, which is closed by a seal 75, and can be actuated manually and the cover 2 can accordingly be unlocked, e.g. during a power failure. It is noted in addition that the flexible conduction band 62, which substantially corresponds to the width of the cover 2, is constructed so as to be resilient and can be pre-formed in such a way that the cover 2 is swiveled into the opened position after unlocking by means of the conduction band 62, but is held at least in this position.

For the sake of completeness, it is noted that provisions are made laterally at the lower part 50 and at the rear wall in the form of a cast-on film 76 which can be broken out for the guiding through of a cable, not shown, which comprises an ignition line, a ground line, a line conducting positive potential, and two data lines for use of the data storage device e.g. in a motor vehicle.

While the invention has been illustrated and described as embodied in an apparatus for receiving a transportable card or disk-shaped data storage, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A data storage device with an arrangement receiving a transportable, card-shaped or disk-shaped data storage unit by means of which the data storage unit is brought into an operating position in which it is inaccessible, the device comprising:
   a front wall having an opening 41;
   a rocker member arranged as a cover 2 in the opening 41 and rotatably supported along a bearing axis at the front wall so as to be openable and closeable in a rocking manner;
   holding means 22, 23, 64 holding the data storage unit, said holding means being arranged at an inner face of the cover 2 so that the data storage unit 45 is substantially parallel to the front wall when the cover 2 is in a closed position; and
   gripping means 5 provided at an outer face of the cover 2 so as to facilitate rotation of the cover 2, the bearing axis running through the rocker member so as to divide the rocker member into two sides, the holding means for the data storage unit 45 being provided on one side of the rocker member relative to the bearing axis of the rocker member, whereas another side of the rocker member relative to the bearing axis is constructed at least partially as the gripping means 5.

2. A data storing device according to claim 1, and further comprising bearing journals 12, 13 provided on opposite front edges of the cover 2, and bearings 39, 40 provided at an inside portion of the front wall so as to engage the bearing journals.

3. A data storing device according to claim 1, and further comprising resilient locking means 28, 29 provided on the cover 2 for keeping the cover 2 closed in the operating position.

4. A data storage device according to claim 1, and further comprising contact means 64 fastened to the cover 2 which contacts the data storage unit 45, and a printed circuit board 53 securely connected to the front wall, the contact means 64 and the printed circuit board 53 being connected by means of a flexible conduction band 62 which also acts as a spring to bias said cover to an open position.

5. A data storage device according to claim 1, and further comprising and electromechanical lock 19, 20, 21, provided on the cover 2, said lock being controllable by a key 6 which is accessible on the outer face of the cover.

6. A data storage device according to claim 5, and further comprising means 8 for providing a release indication in response to operation of the key 6.

7. A data storage device according to claim 1, wherein the rocker member is shaped so that in the closed position the one side 3 of the rocker member provided with the holding means for the data storage unit 45 is substantially flush with a front surface of the front wall, and the other side of the rocker member, having the gripping means 5, projects at least partially out of a plane of the front surface of the front wall.

* * * * *